(12) United States Patent
Fetterhoff

(10) Patent No.: US 11,320,664 B2
(45) Date of Patent: May 3, 2022

(54) BEAM COMBINER FOR OPTICAL BEAMS WITH DIFFERING BEAM PROPERTIES

(71) Applicant: Raytheon Company, Waltham, MA (US)

(72) Inventor: Ken A. Fetterhoff, Vail, AZ (US)

(73) Assignee: Raytheon Company, Waltham, MA (US)

( * ) Notice: Subject to any disclaimer, the term of this patent is extended or adjusted under 35 U.S.C. 154(b) by 85 days.

(21) Appl. No.: 15/930,013

(22) Filed: May 12, 2020

(65) Prior Publication Data
US 2021/0356753 A1    Nov. 18, 2021

(51) Int. Cl.
*G02B 27/14*    (2006.01)
*G02B 27/12*    (2006.01)

(52) U.S. Cl.
CPC ................ *G02B 27/126* (2013.01)

(58) Field of Classification Search
CPC ................................................. G02B 27/126
USPC ................................................. 359/629, 638
See application file for complete search history.

(56) References Cited

U.S. PATENT DOCUMENTS

| 9,829,636 | B2 | 11/2017 | Stacey et al. | |
| 2014/0036364 | A1* | 2/2014 | Doric | G02B 27/283 359/489.08 |
| 2019/0049744 | A1 | 2/2019 | Yeung | |

* cited by examiner

*Primary Examiner* — William Choi

(57) ABSTRACT

An apparatus includes a beam combiner structured as a prism. The beam combiner includes a first side configured to transmit a first beam generated from a first beam generator into the prism. The beam combiner also includes a second side configured to internally reflect the first beam and transmit a second beam generated from a second beam generator into the prism. The beam combiner further includes a third side configured to transmit the first beam and the second beam as a combined beam to a beam receiver.

20 Claims, 4 Drawing Sheets

BEAM COMBINER FOR OPTICAL BEAMS WITH DIFFERING BEAM PROPERTIES

TECHNICAL FIELD

This disclosure is generally directed to laser or other optical systems. More specifically, this disclosure is directed to a beam combiner for optical beams with differing beam properties.

BACKGROUND

There have been various problems in the laser and optics industries when combining optical beams with differing beam properties, such as differing divergence, differing wavelength, or both. Traditional approaches, such as the use of a pellicle and mirror, are not robust, and performance can be comprised when vibration is introduced.

SUMMARY

This disclosure is directed to a beam combiner for optical beams with differing beam properties.

In a first embodiment, an apparatus includes a beam combiner that includes a prism. The prism includes a first side configured to transmit a first beam generated from a first beam generator into the prism. The prism also includes a second side configured to internally reflect the first beam and transmit a second beam generated from a second beam generator into the prism. The prism further includes a third side configured to transmit the first beam and the second beam as a combined beam to a beam receiver.

In a second embodiment, a system includes a first beam generator, a second beam generator, and a prism. The first beam generator is configured to generate a first beam. The second beam generator is configured to generate a second beam. The prism is configured to combine the first beam and the second beam into a combined beam. The prism includes a first side configured to transmit the first beam into the prism, a second side configured to internally reflect the first beam and transmit the second beam into the prism, and a third side configured to transmit the first beam and the second beam as a combined beam to a beam receiver.

In a third embodiment, a method includes transmitting, through a first side of a prism, a first beam generated from a first beam generator into the prism. The method also includes internally reflecting the first beam on a second side of the prism. The method further includes transmitting, through the second side of the prism, a second beam generated from a second beam generator into the prism. In addition, the method includes transmitting, through a third side of the prism, the first beam and the second beam as a combined beam to a beam receiver.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1A through 4, described below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described. Omission of a feature or component from a particular figure is for purposes of simplicity and clarity and is not meant to imply that the feature or component cannot be employed in the embodiments described in connection with that figure.

This disclosure provides various optical beam combiners, each of which can combine laser or other optical beams of differing properties into a single coaxial beam. The optical beam combiners enable the combining of optical beams having differing properties, such as differing divergence or differing pulse characteristics. The optical beam combiners also enable the combining of optical beams at different angles of incidence onto a single optical axis.

Figure 1A:
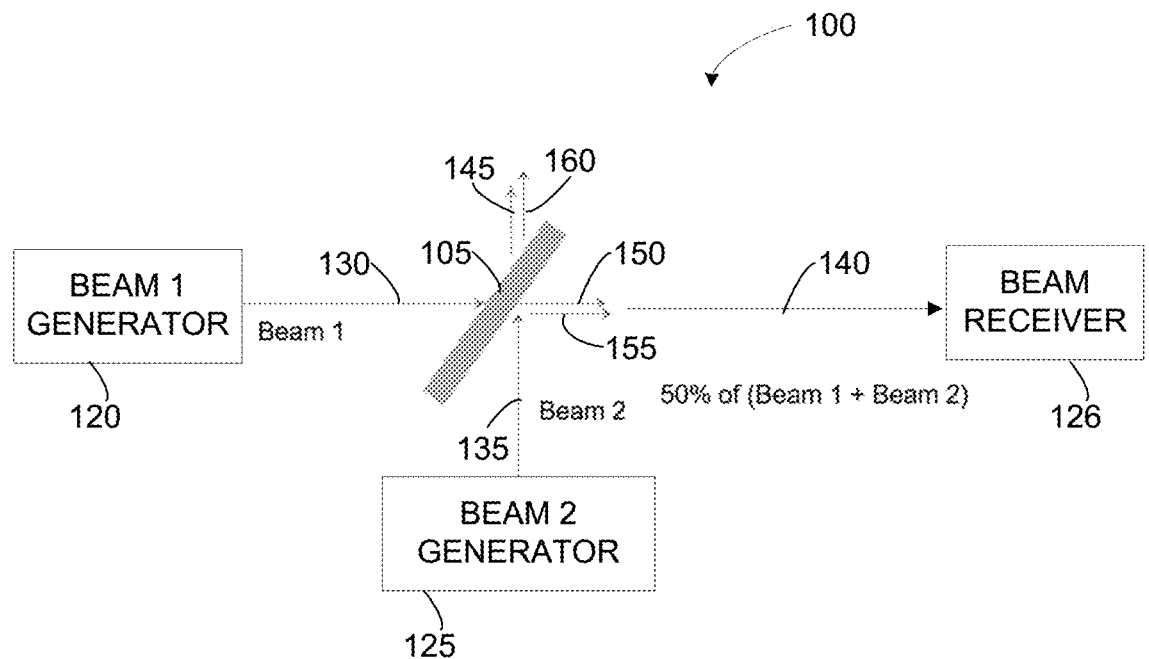
FIGS. 1A, 1B, and 1C illustrate example beam combiner systems that experience energy loss.
Figure 1B:
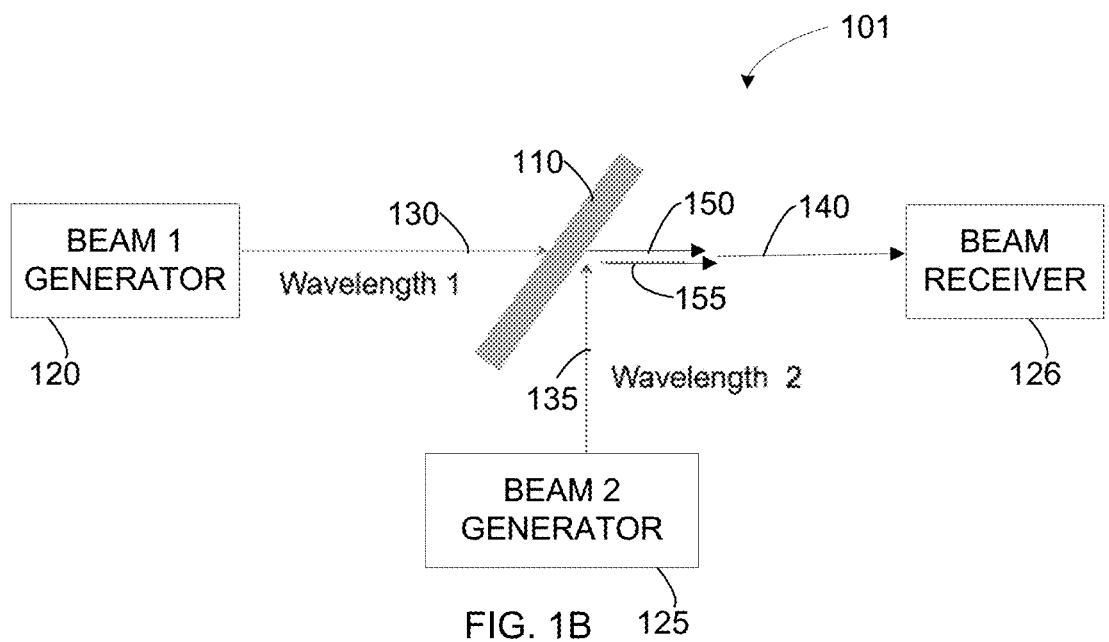
Figure 1C:
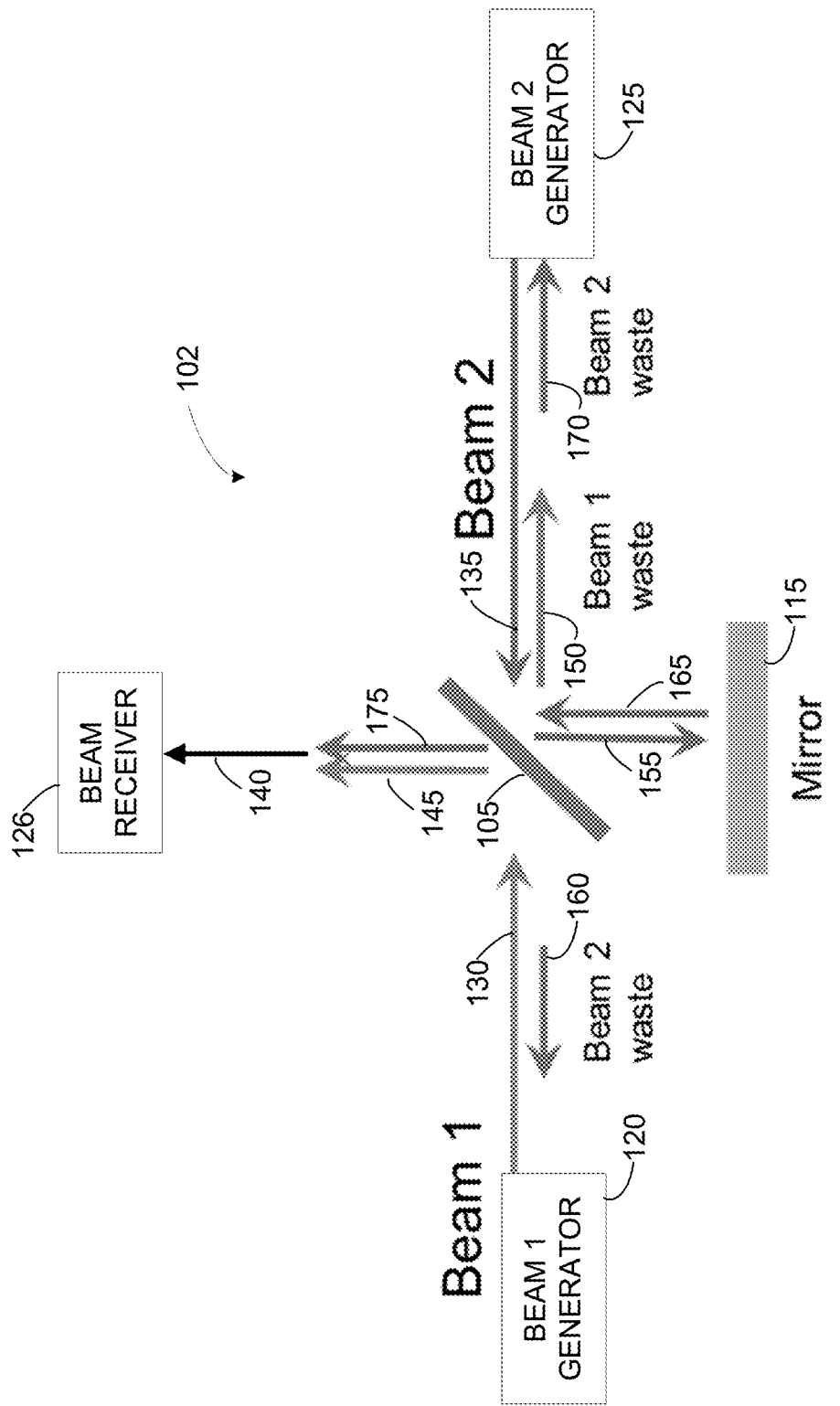

FIGS. 1A, 1B, and 1C illustrate example beam combiner systems 100-102 that experience energy loss. More specifically, FIG. 1A illustrates an example beam splitter 105 used in a beam combiner system 100, FIG. 1B illustrates an example dichroic mirror 110 used in a beam combiner system 101, and FIG. 1C illustrates an example combination of a beam splitter 105 and mirror 115 used in a beam combiner system 102. For simplicity of discussion, some of the combined beams illustrated in FIGS. 1A, 1B, and 1C are shown as parallel but offset. While shown in this manner, the combined beams are actually coaxial and are received at a beam receiver at the same point.

Each of the beam combiner systems 100-102 includes a first beam generator 120, a second beam generator 125, a beam receiver 126, and a beam combiner (the beam splitter 105, the dichroic mirror 110, or both the beam splitter 105 and the mirror 115). The first beam generator 120 generates a first beam 130, and the second beam generator 125 generates a second beam 135. The first beam 130 and the second beam 135 can have differing properties, such as differing wavelengths, differing divergence, etc. The first beam generator 120 and the second beam generator 125 occupy different spaces and therefore require a beam combiner to coaxially align the first beam 130 and the second beam 135. Each of the beam combiner systems 100-102 can provide a coaxial beam 140 to the beam receiver 126, where the coaxial beam 140 represents a combination of the first and second beams 130, 135.

As shown in FIG. 1A, the first beam generator 120 is positioned on a first side of the beam splitter 105 so that the first beam 130 is directed at the first side of the beam splitter 105. The beam splitter 105 creates a first beam reflective component 145 and a first beam transmissive component 150. The first beam reflective component 145 is a portion of the first beam 130 that is reflected from the first side of the beam splitter 105. The first beam transmissive component 150 is a portion of the first beam 130 that is transmitted through the beam splitter 105. The amount of energy distributed between the first beam reflective component 145 and the first beam transmissive component 150 is based on the angle of incidence at the plane of entry through the beam splitter 105. The angle of incidence refers to the angle between the first beam 130 and the first side of the beam splitter 105. As the angle of incidence changes, the amounts of energy distributed between the first beam reflective component 145 and the first beam transmissive component 150 are adjusted. An optimal angle of incidence for the first beam 130 to interact with the beam splitter 105 may be 45°. At the optimal angle of incidence, the energy of the first beam 130 is distributed equally between the first beam reflective component 145 and the first beam transmissive component 150.

The second beam generator 125 is located on a second side of the beam splitter 105 so that the second beam 135 is directed at the second side of the beam splitter 105. The beam splitter 105 creates a second beam reflective component 155 and a second beam transmissive component 160. The energy distribution of the second beam 135 between the second beam reflective component 155 and the second beam transmissive component 160 may be similar to the energy distribution of the first beam 130. In some cases, the second beam 135 is directed at the beam splitter 105 approximately at a 45° angle. This positioning aligns the first beam reflective component 145 with the second beam transmissive component 160 and aligns the first beam transmissive component 150 with the second beam reflective component 155. In the embodiment of FIG. 1A, the first beam transmissive component 150 and the second beam reflective component 155 are combined into the coaxial beam 140 transmitted to the beam receiver 126, and the first beam reflective component 145 and the second beam transmissive component 160 are wasted energy. In other embodiments, the first beam reflective component 145 and the second beam transmissive component 160 may be transmitted to the beam receiver 126.

One downside of using the beam splitter 105 in this manner is that the combine beam 140 can experience a substantial energy loss, up to 50% energy loss, compared to the combined energy of the first beam 130 and the second beam 135. Also, any problems with the coating of the beam splitter 105 may reduce a damage threshold for operating efficiently. In addition, if a pellicle is used as the beam splitter 105, the beam combiner system 100 is extremely fragile and susceptible to minor vibrations, and any slight misalignment may cause the entire beam combiner system 100 to stop operating correctly.

As shown in FIG. 1B, the arrangement of the first beam generator 120 and the second beam generator 125 in relation to the dichroic mirror 110 is similar to the arrangement of the beam combiner system 100 shown in FIG. 1A. The dichroic mirror 110 can be designed to transmit almost the entire energy of the first beam 130 and reflect almost the entire energy of the second beam 135. The dichroic mirror 110 produces minimal energy waste from the beams 130, 135, but the use of the dichroic mirror 110 does not allow for the first beam 130 and the second beam 135 to be generated at the same wavelength. The dichroic mirror 110 may also have issues with respect to its coating damage threshold.

As shown in FIG. 1C, the first beam generator 120 and the second beam generator 125 are located on opposite sides of the beam splitter 105 so that the first beam 130 and the second beam 135 are aligned in opposite directions. The mirror 115 is placed on an opposite side of the beam splitter 105 from the beam receiver 126. The beam splitter 105 splits the first beam 130 into the first beam reflective component 145 and the first beam transmissive component 150. In some embodiments, the first beam reflective component 145 is transmitted to the beam receiver 126, and the first beam transmissive component 150 is beam waste. The beam splitter 105 also splits the second beam 135 into the second beam reflective component 155 and the second beam transmissive component 160. The second beam transmissive component 160 is beam waste, and the second beam reflective component 155 is reflected to the mirror 115. The mirror 115 reflects the second beam reflective component 155 as a mirrored second beam component 165, which is mirrored back at the beam splitter 105 in the opposite direction. The beam splitter 105 splits the mirrored second beam component 165 into a mirrored second beam reflective component 170 that is beam waste and a mirrored second beam transmissive component 175 that is aligned with the first beam reflective component 145. The mirrored second beam transmissive component 175 is coaxially aligned with the first beam reflective component 145 to be transmitted in combination as the coaxial beam 140 to the beam receiver 126.

Figure 2:
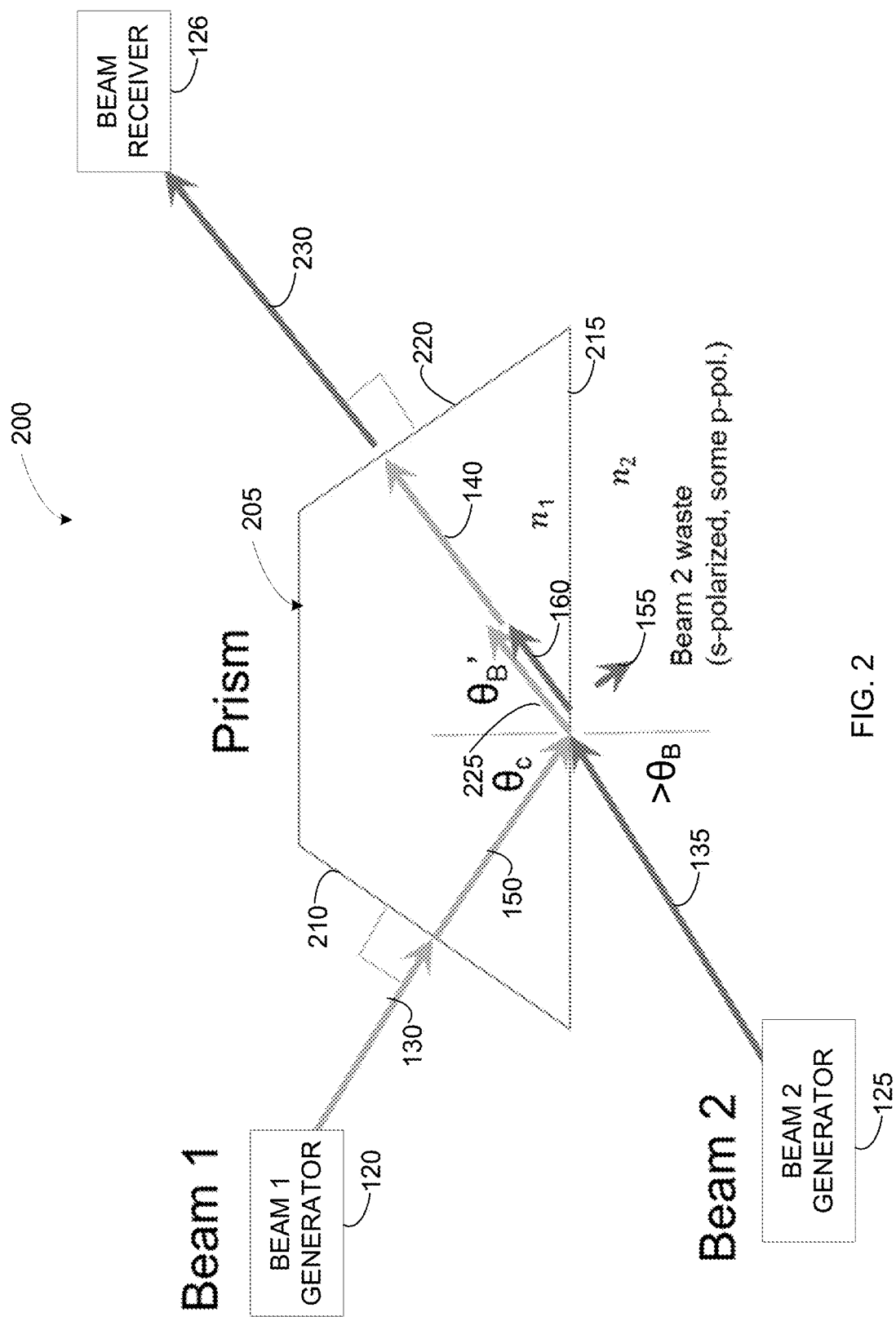
FIG. 2 illustrates an example beam combiner system for optical beams with differing beam properties according to this disclosure.

FIG. 2 illustrates an example beam combiner system 200 for optical beams with differing beam properties according to this disclosure. As shown in FIG. 2, the beam combiner system 200 include the first beam generator 120, the second beam generator 125, and the beam receiver 126. Each beam generator 120, 125 includes any suitable structure configured to generate an optical beam to be combined, such as a laser. The beam receiver 126 any suitable structure configured to receive a combined optical beam, such as a photo-detector.

The beam combiner system 200 of FIG. 2 also uses a prism 205 as a beam combining element. The prism 205 can have any suitable shape with any suitable number of sides, as long as the prism 205 includes a first side 210 that receives the first beam 130, a second side 215 that receives the second beam 135, and a third side 220 that provides the combined beam 140.

The first side 210 refers to a side in which the first beam 130 is transmitted into the prism 205. The first beam 130 is substantially or completely orthogonal to the first side 210 of the prism 205. The orthogonality of the first beam 130 allows all or substantially all energy in the first beam 130 to be transmitted through the first side 210 of the prism 205 undeviated as a first beam transmissive component 150 (with little or none of the beam energy being wasted as a reflective component).

The second side 215 can be structured at first angle $\theta_c$ relative to the first side 210. The angle $\theta_c$ may be determined based on the following equation:

$$\theta_c = \sin^{-1}\left(\frac{n_2}{n_1}\right) \qquad (1)$$

where $n_1$ is based on the refractive index of the material forming the prism 205 and $n_2$ is based on the refractive index of the material surrounding the prism 205 (such as air). The angle $\theta_c$ is the angle from a plane orthogonal to the second side 215 so that the first beam transmissive component 150 experiences total internal reflection. The first beam transmissive component 150, when oriented at the angle $\theta_c$ from the orthogonal plane, can therefore have all or substantially all of its total energy reflected off the second side 215 to form a first beam total reflective component 225.

The second beam 135 has an angle $\theta_B$ from the plane orthogonal to the second side 215 that is larger than the angle $\theta$. The angle $\theta_B$ may be determined based on the following equation:

$$\theta_B = \tan^{-1}\left(\frac{n_1}{n_2}\right) \quad (2)$$

The second beam 135, when oriented at the angle $\theta_B$ in relation to the orthogonal plane of the second side 215, can have substantially all of its energy transmitted through the second side 215 of the prism 205 to form a second beam transmissive component 160. With proper positioning of the second beam generator 125, the second beam transmissive component 160 is coaxial with the first beam total reflective component 225. At this point, the second beam transmissive component 160 and the first beam total reflective component 225 form the coaxial beam 140.

Because the second beam 135 is not being transmitted an orthogonal angle to the second side 215, a small portion of the second beam 135 is reflected as a second beam reflective component 155 and ends up as waste. However, this second beam reflective component 155 can be reduced or minimized, such as by using a suitable polarization of the second side 215. In certain embodiments, the beams can be p-polarized.

The third side 220 is structured so that the coaxial beam 140 is substantially or completely orthogonal to the third side 220. The orthogonality of the coaxial beam 140 allows an increased or maximum amount of beam energy to be transmitted through the third side 220 as a coaxial transmissive beam 230, which is received by the beam receiver 126 as the combined beam 140. The angle $\theta_B'$ between the third side 220 and the plane orthogonal to the second side 215 (also between the third side 220 and the second side 215) may be determined based on the following equation:

$$\theta_B' = \sin^{-1}\left(\frac{n_1}{n_2}\sin\theta_B\right) \quad (3)$$

The angle $\theta_B'$ is based on the coaxial beam 140 being oriented orthogonally to the third side 220. The angle $\theta_B'$ is based on the angle that the first beam total reflective component 225 and the second beam transmissive component 160 are oriented from the orthogonal plane of the second side 215. In certain embodiments, the second beam may require minor adjustments in regard to $\theta_B$ in order that the second beam transmissive component 160 is coaxial to first beam total reflective component 225.

Although FIG. 2 illustrates one example of a beam combiner system 200 for optical beams with differing beam properties, various changes may be made to FIG. 2. For example, the prism 205 may have any other suitable shape and size. Also, various angles, positions, and amounts of energy transmittance/reflectance described above are approximate values only and can vary somewhat depending on the implementation. In addition, note that the beams 130, 135 may be directed to the prism 205 in any suitable manner, such as through free-space or via optical fibers. Thus, while reference is often made to the position of the beam generators 120, 125, the beams 130, 135 may be directed to the prism 205 in various ways.

Figure 3:
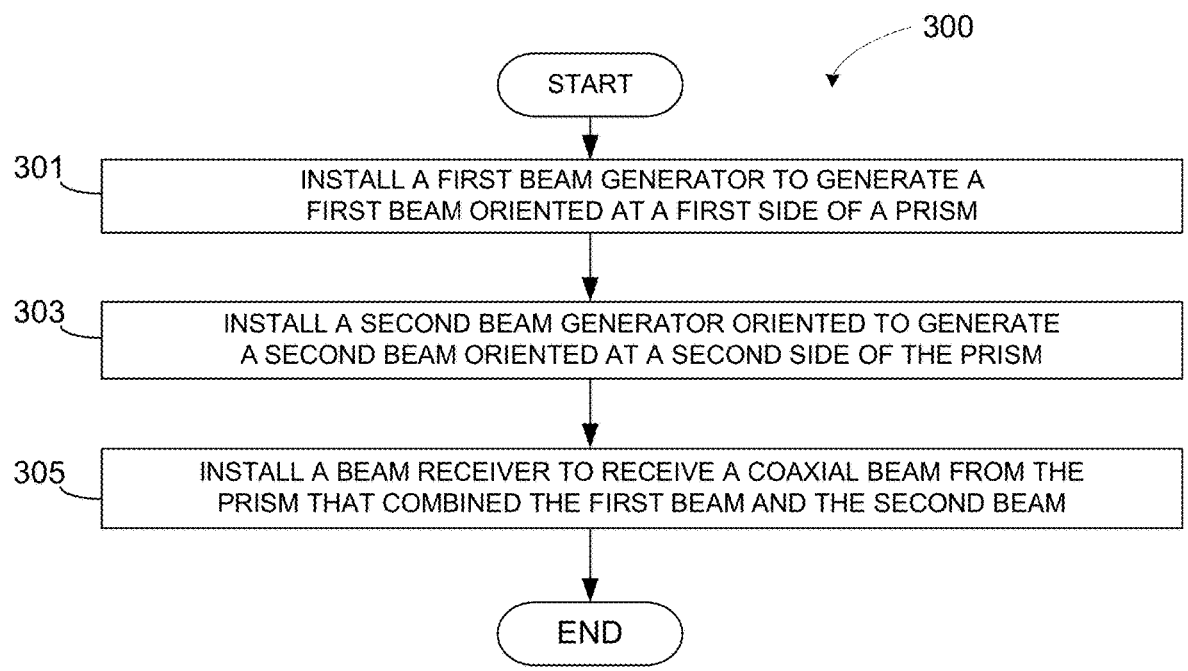
FIG. 3 illustrates an example method for forming a beam combiner system according to this disclosure.

FIG. 3 illustrates an example method 300 for forming a beam combiner system according to this disclosure. For ease of explanation, the method 300 is described as involving the use of the prism 205 of FIG. 2. However, the method 300 may be used with any other suitable device or system. In the description of FIG. 3, the beam combiner (prism 205) is fixed within the system to not be misaligned.

At step 301, a first beam generator 120 is installed in a manner to generate a first beam 130 that is aimed substantially or completely orthogonal to a first side 210 of the prism 205. The first beam 130 will therefore substantially or completely transmit through the first side 210 of the prism 205 towards an inner surface of the second side 215 of the prism 205. The second side 215 of the prism 205 is structured to be at an angle $\theta_c$ from the first side 210 of the prism 205.

At step 303, a second beam generator 125 is installed in a manner to generate a second beam 135 that is aimed at an outer surface of a second side 215 of the prism 205. The second beam 135 will therefore substantially transmit through the second side 210, ideally at substantially the same location that the first beam 130 internally reflects off the second side 215. The second beam 135 is orientated at an angle $\theta_B$ from a plane that is orthogonal to the second side 215.

At step 305, a beam receiver 126 is installed in a manner to be aligned with a coaxial transmissive beam 230 or other combined beam 140 that is combined in the prism 205 and transmitted through a third side 220 of the prism 205. The third side 220 of the prism 205 is structured at an angle $\theta_B'$ from the second side 215 of the prism 205.

Although FIG. 3 illustrates one example of a method 300 for forming a beam combiner system, various changes may be made to FIG. 3. For example, while shown as a series of steps, various steps shown in FIG. 3 may overlap, occur in parallel, occur in a different order, or occur multiple times.

Figure 4:
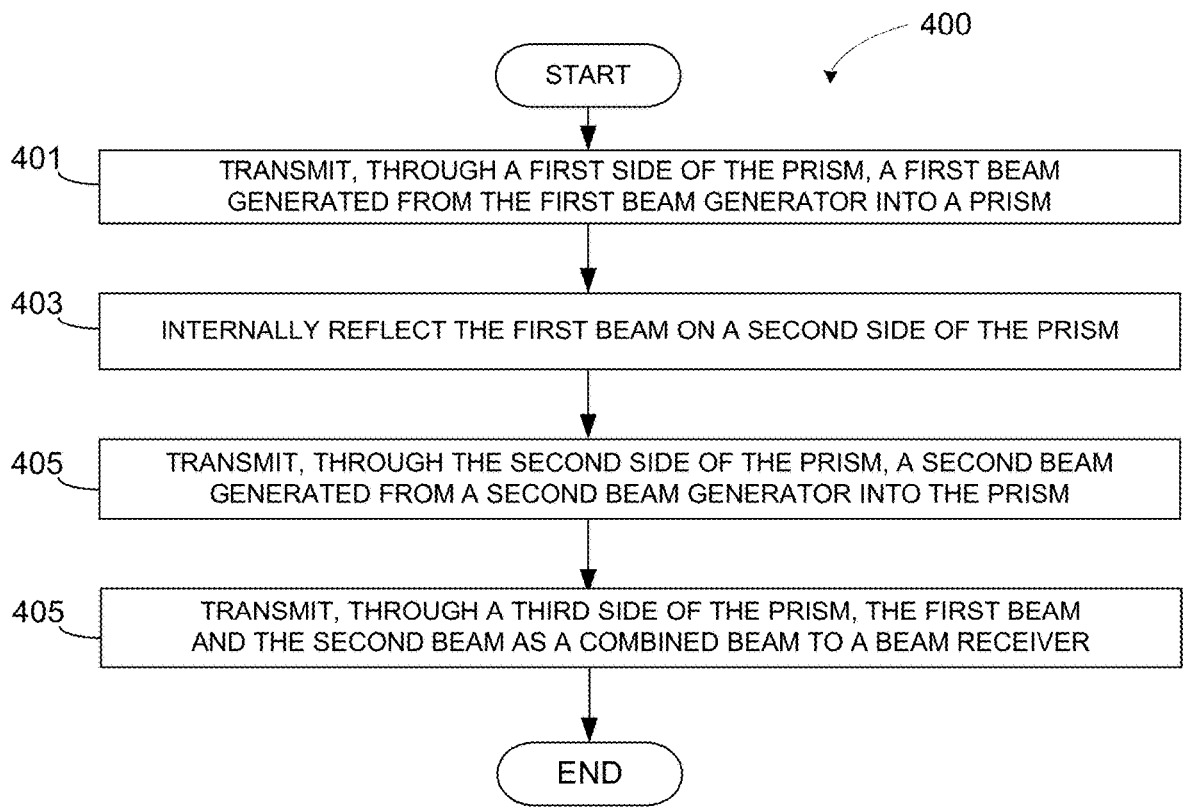
FIG. 4 illustrates an example method for using a beam combiner system according to this disclosure.

FIG. 4 illustrates an example method 400 for using a beam combiner system according to this disclosure. For ease of explanation, the method 400 is described as involving the use of the prism 205 of FIG. 2. However, the method 400 may be used with any other suitable device or system.

At step 401, a first beam 130 is transmitted through a first side 210 of a prism 205. The first beam 130 is generated by the first beam generator 120. The first beam 130 is oriented substantially or completely orthogonal to the first side 210 of the prism 205 in order to reduce or minimize energy loss into the prism 205. At step 403, the first beam 130 is internally reflected on a second side 215 of the prism 205. The second side 215 is angled from the first side 210 in a manner that all or substantially all energy of the first beam 130 is internally reflected.

At step 405, a second beam 135 is transmitted through the second side 215 of the prism 205. The second beam 135 is generated by the second beam generator 125. The orientation of the second beam 135 is based on an angle at which the second beam 135 transmits most of its energy through the second side 215. The second beam 135 is aimed at substantially the same point on the second side 215 where the first beam 130 is internally reflected. Because the bulk of the second beam 135 transmits through the second side 215 at that point, the first beam 130 and the second beam 135 can be combined into a coaxial beam 140.

At step 407, the coaxial beam 140 is transmitted through a third side 220 of the prism 205 to be received by a beam receiver 126. As the first beam 130 and the second beam 135 are coaxial, any deviation from an orthogonal angle between the coaxial beam 140 and the third side 220 would be experienced similarly by both the first beam 130 and the second beam 135. In this circumstance, the first beam 130 and the beam 135 would remain coaxial after the transmission through the third side 220, whereas offset beams may experience different amounts of deflection through the third side 220 based on a non-orthogonal angle.

Although FIG. 4 illustrates one example of a method 400 for using a beam combiner system, various changes may be made to FIG. 4. For example, while shown as a series of steps, various steps shown in FIG. 4 may overlap, occur in parallel, occur in a different order, or occur multiple times.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," or "system" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
 a beam combiner comprising a prism, the prism comprising:
  a first side configured to transmit a first beam generated from a first beam generator into the prism;
  a second side configured to internally reflect the first beam and transmit a second beam generated from a second beam generator into the prism; and
  a third side configured to transmit the first beam and the second beam as a combined beam to a beam receiver;
 wherein the prism is configured to orthogonally transmit the combined beam through the third side.

2. The apparatus of claim 1, wherein the prism is configured to coaxially combine the first beam and the second beam to form the combined beam.

3. The apparatus of claim 1, wherein the prism is configured to receive the second beam at a location on the second side where the first beam is internally reflected.

4. An apparatus comprising:
 a beam combiner comprising a prism, the prism comprising:
  a first side configured to transmit a first beam generated from a first beam generator into the prism;
  a second side configured to internally reflect the first beam and transmit a second beam generated from a second beam generator into the prism; and
  a third side configured to transmit the first beam and the second beam as a combined beam to a beam receiver;
 wherein the prism is configured to receive the first beam orthogonally through the first side.

5. The apparatus of claim 4, wherein the prism is configured to orthogonally transmit the combined beam through the third side.

6. An apparatus comprising:
 a beam combiner comprising a prism, the prism comprising:
  a first side configured to transmit a first beam generated from a first beam generator into the prism;
  a second side configured to internally reflect the first beam and transmit a second beam generated from a second beam generator into the prism; and
  a third side configured to transmit the first beam and the second beam as a combined beam to a beam receiver;
 wherein an angle $\theta_c$ between the first side and the second side of the prism is defined by:

$$\theta_c = \sin^{-1}\left(\frac{n_2}{n_1}\right)$$

where $n_1$ is a refractive index of a material forming the prism and $n_2$ is a refractive index of a material surrounding the prism.

7. An apparatus comprising:
 a beam combiner comprising a prism, the prism comprising:
  a first side configured to transmit a first beam generated from a first beam generator into the prism;
  a second side configured to internally reflect the first beam and transmit a second beam generated from a second beam generator into the prism; and
  a third side configured to transmit the first beam and the second beam as a combined beam to a beam receiver;
 wherein an angle $\theta_B'$ between the second side and the third side of the prism is defined by:

$$\theta_B' = \sin^{-1}\left(\frac{n_1}{n_2}\sin\theta_B\right)$$

where:

$$\theta_B = \tan^{-1}\left(\frac{n_1}{n_2}\right)$$

where $n_1$ is a refractive index of a material forming the prism and $n_2$ is a refractive index of a material surrounding the prism.

8. A system comprising:
a first beam generator configured to generate a first beam;
a second beam generator configured to generate a second beam; and
a prism configured to combine the first beam and the second beam into a combined beam, the prism comprising:
a first side configured to transmit the first beam into the prism;
a second side configured to internally reflect the first beam and transmit the second beam into the prism; and
a third side configured to transmit the first beam and the second beam as the combined beam to a beam receiver;
wherein the prism is configured to receive the first beam orthogonally through the first side.

9. The system of claim 8, wherein the prism is configured to coaxially combine the first beam and the second beam to form the combined beam.

10. The system of claim 8, wherein the prism is configured to receive the second beam at a location on the second side where the first beam is internally reflected.

11. A system comprising:
a first beam generator configured to generate a first beam;
a second beam generator configured to generate a second beam; and
a prism configured to combine the first beam and the second beam into a combined beam, the prism comprising:
a first side configured to transmit the first beam into the prism;
a second side configured to internally reflect the first beam and transmit the second beam into the prism; and
a third side configured to transmit the first beam and the second beam as the combined beam to a beam receiver;
wherein the prism is configured to orthogonally transmit the combined beam through the third side.

12. The system of claim 11, wherein the prism is configured to receive the first beam orthogonally through the first side.

13. A system comprising:
a first beam generator configured to generate a first beam;
a second beam generator configured to generate a second beam; and
a prism configured to combine the first beam and the second beam into a combined beam, the prism comprising:
a first side configured to transmit the first beam into the prism;
a second side configured to internally reflect the first beam and transmit the second beam into the prism; and
a third side configured to transmit the first beam and the second beam as the combined beam to a beam receiver;
wherein an angle 74$_c$ between the first side and the second side of the prism is defined by:

$$\theta_c = \sin^{-1}\left(\frac{n_2}{n_1}\right)$$

where $n_1$ is a refractive index of a material forming the prism and $n_2$ is a refractive index of a material surrounding the prism.

14. A system comprising:
a first beam generator configured to generate a first beam;
a second beam generator configured to generate a second beam; and
a prism configured to combine the first beam and the second beam into a combined beam, the prism comprising:
a front side configured to transmit the first beam into the prism;
a second side configured to internally reflect the first beam and transmit the second beam into the prism; and
a third side configured to transmit the first beam and the second beam as the combined beam to a beam receiver;
wherein an angle $\theta_B'$ between the second side and the third side of the prism is defined by:

$$\theta_B' = \sin^{-1}\left(\frac{n_1}{n_2}\sin\theta_B\right)$$

where:

$$\theta_B = \tan^{-1}\left(\frac{n_1}{n_2}\right)$$

where $n_1$ is a refractive index of a material forming the prism and $n_2$ is a refractive index of a material surrounding the prism.

15. A method comprising:
transmitting, through a first side of a prism, a first beam generated from a first beam generator into the prism;
internally reflecting the first beam on a second side of the prism;
transmitting, through the second side of the prism, a second beam generated from a second beam generator into the prism; and
transmitting, through a third side of the prism, the first beam and the second beam as a combined beam to a beam receiver;
wherein the combined beam is orthogonally transmitted through the third side.

16. The method of claim 15, wherein the first beam and the second beam are coaxially combined to form the combined beam.

17. The method of claim 15, wherein the second beam is received at a location on the second side where the first beam is internally reflected.

18. A method comprising:
transmitting, through a first side of a prism, a first beam generated from a first beam generator into the prism;
internally reflecting the first beam on a second side of the prism;
transmitting, through the second side of the prism, a second beam generated from a second beam generator into the prism; and
transmitting, through a third side of the prism, the first beam and the second beam as a combined beam to a beam receiver;
wherein the first beam is orthogonally transmitted through the first side.

19. A method comprising:
  transmitting, through a first side of a prism, a first beam generated from a first beam generator into the prism;
  internally reflecting the first beam on a second side of the prism;
  transmitting, through the second side of the prism, a second beam generated from a second beam generator into the prism; and
  transmitting, through a third side of the prism, the first beam and the second beam as a combined beam to a beam receiver;
  wherein an $\theta_c$ angle between the first side and the second side of the prism is defined by:

$$\theta_c = \sin^{-1}\left(\frac{n_2}{n_1}\right)$$

where $n_1$ is a refractive index of a material forming the prism and $n_2$ is a refractive index of a material surrounding the prism.

20. A method comprising:
  transmitting, through a first side of a prism, a first beam generated from a first beam generator into the prism;
  internally reflecting the first beam on a second side of the prism;
  transmitting, through the second side of the prism, a second beam generated from a second beam generator into the prism; and
  transmitting, through a third side of the prism, the first beam and the second beam as a combined beam to a beam receiver;
  wherein an angle $\theta_B'$ between the second side and the third side of the prism is defined by:

$$\theta_B' = \sin^{-1}\left(\frac{n_1}{n_2}\sin\theta_B\right)$$

where:

$$\theta_B = \tan^{-1}\left(\frac{n_1}{n_2}\right)$$

where $n_1$ is a refractive index of a material forming the prism and $n_2$ is a refractive index of a material surrounding the prism.

* * * * *